3 Sheets—Sheet 1.

T. R. TIMBY.
REVOLVING BATTERY TOWER.

No. 35,846. Patented July 8, 1862.

3 Sheets—Sheet 2.

T. R. TIMBY.
REVOLVING BATTERY TOWER.

No. 35,846. Patented July 8, 1862.

3 Sheets—Sheet 3.
T. R. TIMBY.
REVOLVING BATTERY TOWER.
No. 35,846. Patented July 8, 1862.
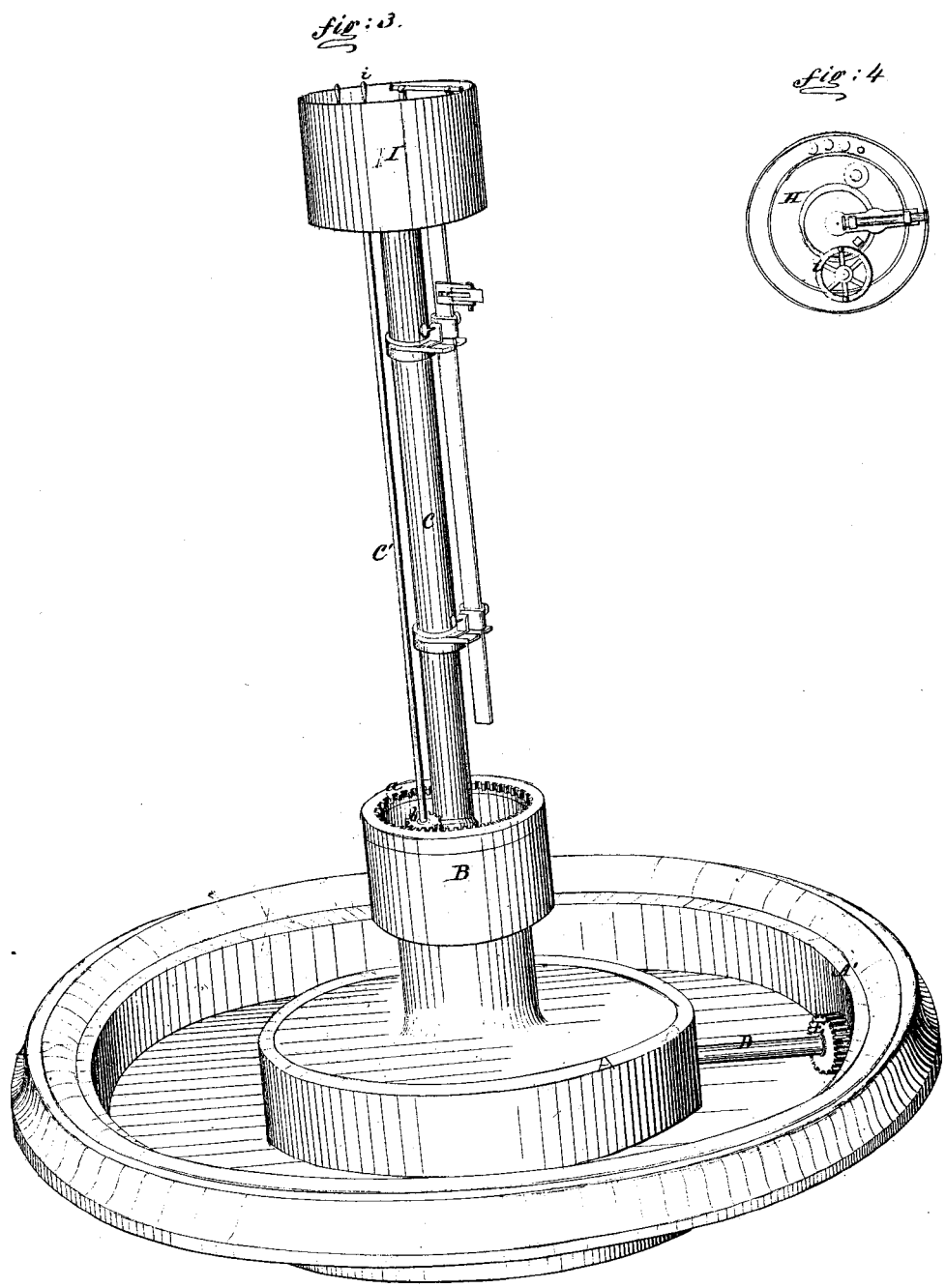

UNITED STATES PATENT OFFICE.

THEODORE R. TIMBY, OF WORCESTER, MASSACHUSETTS.

IMPROVEMENT IN REVOLVING BATTERY-TOWERS.

Specification forming part of Letters Patent No. 35,846, dated July 8, 1862.

*To all whom it may concern:*

Be it known that I, THEODORE R. TIMBY, of Worcester, in the county of Worcester and State of Massachusetts, have invented an Improvement in Revolving Towers, to be stationed on land or water for defensive or offensive warfare; and I do hereby declare that the following is a full, clear, and exact description of the same, reference being had to the annexed drawings, making a part of this specification, in which—

Figure 1:
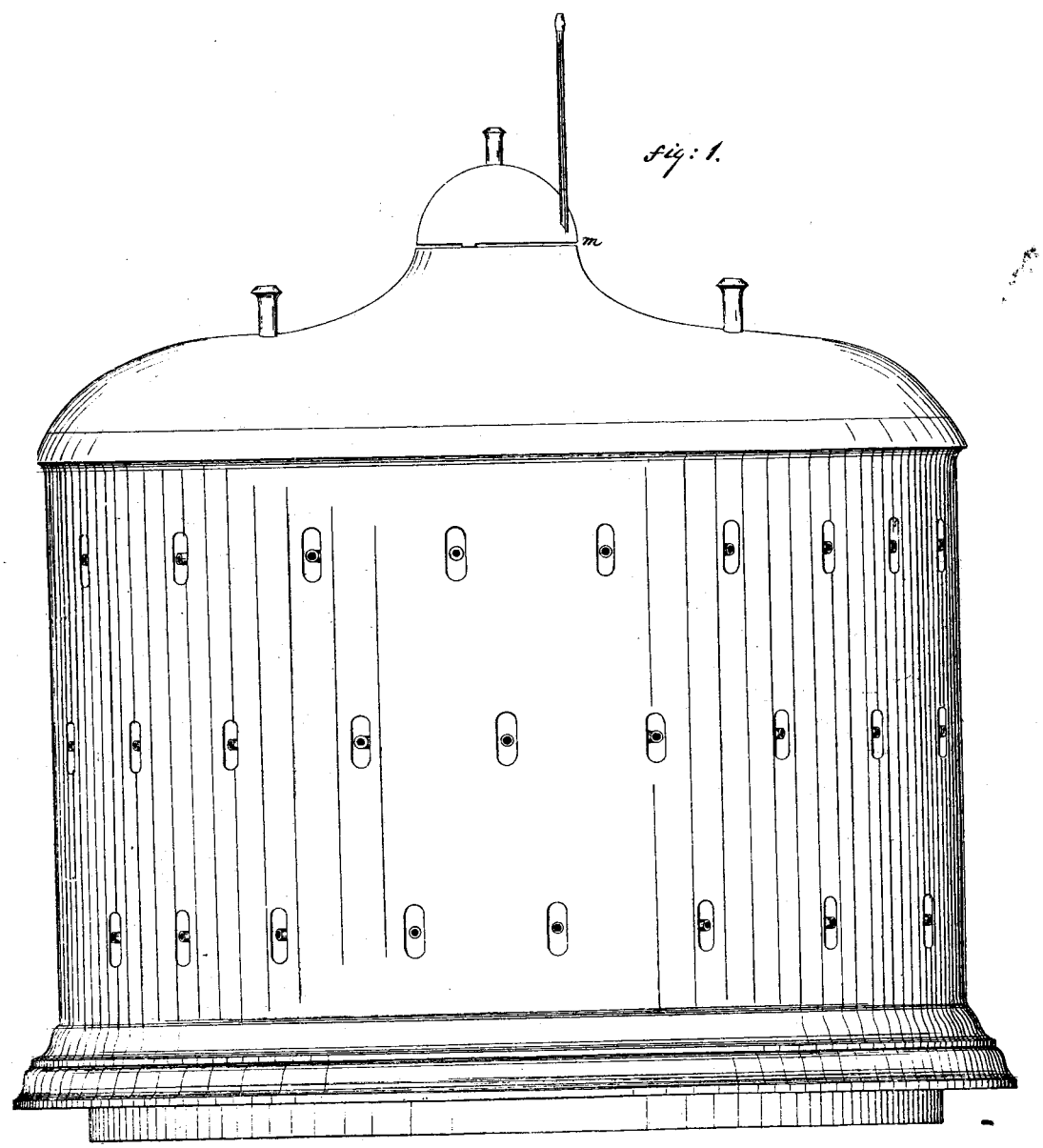
Figure 2:
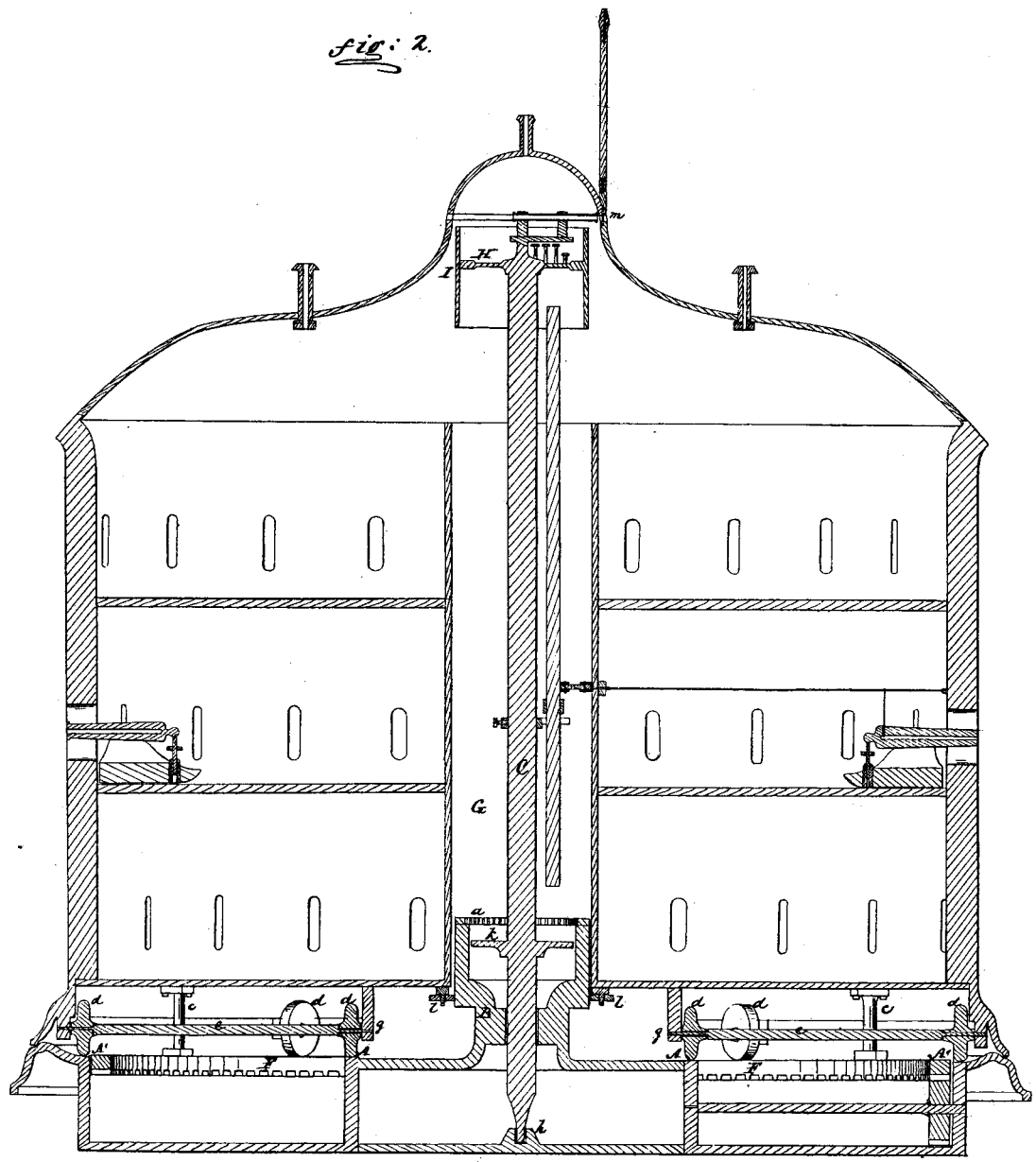

Figure 1 is an elevation of the tower, showing the embrasures and lookout; Fig. 2, a vertical section of the same; Fig. 3, a perspective view of the bed-plate and central shaft with its appendages; and Fig. 4, a top view of the commander's platform with its fixtures of telescopic sight, hand-wheel, and signal-pulls.

In a revolving tower without special provisions the commander's platform or station must be fixed thereto and revolve therewith. When, therefore, it is desirable to concentrate the fire upon a fixed point or object, this necessitates, if that officer would keep his vision upon the object attacked, his constant progression in a direction contrary to that of the revolution of the tower. So, too, if the commander would keep a vigilant watch in all directions, as would be requisite in an attack upon water, or in an attack from both land and water, for instance, he would be compelled to fly from one point to another, and often, in consequence of the opposite revolution of the tower, his progress might be fatally retarded. It is my present purpose to overcome these difficulties, and with this view I combine with my revolving tower a central independently-revolving shaft, upon the top of which, and in close proximity to the lookout, is arranged the commander's platform or station, which is under his constant control, and may at his option be revolved to the right or the left, or suffered to remain stationary, no matter what may be the condition of motion imparted to the tower, or whether it be in a state of rest.

To enable others skilled in the art to make and use my invention, I will proceed to describe its construction and operation.

My revolving tower, whether placed on land or water, is constructed entirely of iron or steel plates of any desirable thickness either in the particulars or aggregate; or it may be backed up or lined with timber, or with other suitable material. Its form may be cylindrical or conico-cylindrical, a truncated cone, or a pyramid, and it should be covered with a bomb-proof roofing, having a lookout at or near the top of the tower, which latter may consist of a slot or aperture through the walls or ramparts around its entire circumference, interrupted only at such points as is necessary to support the roof, which may be dome-formed, or something in the shape of a flattened bell, in which case, if preferred, the lookout may be formed through the barrel thereof. The tower may have one or more tiers of guns, but it will be found generally that one tier is all that a sea-going vessel will need or bear. The guns slide in and out of battery upon radial ways, and of course their extreme number in each tier will be regulated by the circumference of the walls. The tower revolves upon its foundation or base around its vertical axis by steam or other power, and through the instrumentality of well-known or other mechanical agents, so that all its guns may be concentrated upon any point of the compass, follow a moving object, or attack a stationary one, the time occupied in the revolution of the tower being sufficient to allow the guns to cool for repeated discharges. From within a hollow pivot which forms the eye or center of the foundation or base of the tower, and around which the tower revolves, rises a vertical shaft having proper bearings, whose top bears the commander's platform or station, and to which an independent rotation is given by means of a shaft with a hand-wheel attached to its upper end, extending down along the central shaft from the commander's station to a fixed collar attached to the said central shaft, where it is stepped, and has, a little above the step, a pinion which gears into a circular rack on the inside of the hollow pivot. This arrangement admits of an independent revolution of the platform at the will and by the exertion of the commander, and he can, of course, turn himself to any point desired while the tower continues its separate revolution or remains still.

Such is a general description of the improvement I now claim as new.

I shall next proceed to specify those elementary constituents which give to my combination its vitality, not meaning  this to limit myself to the exact mechanic  means described for imparting independent ction to the tower and central shaft, nor t confine myself to the precise arrangemer repre-sented, but to signify that, having po ited out and described one method of carryin into effect my invention, I shall claim all iethods when the joint and individual ope tion of my tower and central shaft is as indi ited.

In the case of a land-tower the g und is excavated for the purpose of recei ng the strong masonry or iron foundation n essary to support the circular railway-trac  A A', but for a water-tower the tracks, co sisting of two concentric castings, cast whc  or in sections, are located about three fee below the deck of the floating battery or gun oat, so that only about two-thirds of the alt ude of the tower will be exposed above. Fr m the center of this foundation, or from the enter of the track, rises the pivot or short s aft B, which is cast or otherwise made hollo to re-ceive the circular rack a, pinion b, and hafts c and c'. The driving-shaft D, carryi g the pinion E has its bearings in the four ation upon which the railway-tracks are la , and extends to the motor, which is situate  from under the tower a proper distance, a d on land is located in a bomb-proof vaul  To the base of the tower is fastened the larg   wheel F, by means of the hangers c,  _ ug teeth on its under face with which the eeth of the pinion E mesh. The tracks A  / be-ing of unequal radii, the friction-roll rs d revolve, each series independently o  the other, on the shafts e, whose bearings  e in the base of the revolving tower and i the hangers g. Friction-rollers l are als ar-ranged around the well G, bearing ag inst the pivot or short shaft B, to prevent l eral deflection of the tower as well as to l ssen friction. The well or curb G, which is constructed concentrically with the axis of the tower, receives at its base the hollow pivot or shaft B, and through it and the hollow pivot or shaft passes the shaft C, which is stepped at h, and carries upon its upper end the platform H with its curb I, upon which the commander stands and turns himself to any desired point of the compass by means of the hand-wheel i, whose shaft C', extending along down side the shaft C, is stepped in he fixed collar or bearing k, and carries the pinion d, which meshes with the circular rack a. A lookout, m, is cut in the barrel of the dome above the commander's station or through any other point thereof, or through the top of the rampart or outer wall, the circumference of the platform H being increased and its elevation diminished accordingly.

From this description it will be observed that the commander of the tower may have an unobstructed view, the lookout m being practically unobstructed during the entire revolution of the tower, and that he may change the direction of his view at will or remain stationary, and this independently of the revolution of the tower.

Having thus described my invention and pointed out the manner in which it operates, what I claim therein as new, and desire to secure by Letters Patent of the United States, is—

A revolving tower for land or water, designed for offensive or defensive warfare, when combined with an independently-rotating shaft, upon the top of which is arranged the commander's platform or station, as described.

THEODORE R. TIMBY.

Witnesses:
JOHN W. SHUGERT,
EDM. F. BROWN.